United States Patent
Pan

(10) Patent No.: US 11,766,625 B2
(45) Date of Patent: Sep. 26, 2023

(54) SYSTEMS FOR CONTROLLING FRACTIONATION USING DYNAMIC COMPETING ECONOMIC OBJECTIVES

(71) Applicant: PHILLIPS 66 COMPANY, Houston, TX (US)

(72) Inventor: Yangdong Pan, Edwardsville, IL (US)

( * ) Notice: Subject to any disclaimer, the term of this patent is extended or adjusted under 35 U.S.C. 154(b) by 0 days.

(21) Appl. No.: 18/060,319

(22) Filed: Nov. 30, 2022

(65) Prior Publication Data

US 2023/0191278 A1 Jun. 22, 2023

Related U.S. Application Data

(60) Provisional application No. 63/292,807, filed on Dec. 22, 2021, provisional application No. 63/292,794, filed on Dec. 22, 2021.

(51) Int. Cl.
| | |
|---|---|
| *B01D 3/14* | (2006.01) |
| *B01D 3/42* | (2006.01) |
| *C10G 7/12* | (2006.01) |
| *G05B 13/04* | (2006.01) |

(52) U.S. Cl.
CPC ............ *B01D 3/4294* (2013.01); *B01D 3/14* (2013.01); *C10G 7/12* (2013.01); *G05B 13/048* (2013.01); *C10G 2300/104* (2013.01); *C10G 2300/1044* (2013.01); *C10G 2300/301* (2013.01)

(58) Field of Classification Search
CPC .......... B01D 3/14; B01D 3/4294; C10G 7/12; G05B 13/048
See application file for complete search history.

(56) References Cited

U.S. PATENT DOCUMENTS

| | | | | |
|---|---|---|---|---|
| 6,751,527 | B2 * | 6/2004 | Herzog | C10G 7/12 210/143 |
| 10,095,200 | B2 * | 10/2018 | Horn | C10G 35/24 |
| 10,534,329 | B2 * | 1/2020 | Horn | C10G 7/12 |
| 11,369,894 | B1 * | 6/2022 | Lee | B01D 3/4205 |
| 11,459,512 | B1 * | 10/2022 | Lee | C10G 7/12 |
| 2005/0040026 | A1 * | 2/2005 | Grub | C10G 7/12 203/1 |
| 2005/0167337 | A1 * | 8/2005 | Bunger | C10G 21/00 208/254 R |
| 2006/0006099 | A1 * | 1/2006 | Espinoza | C10G 47/36 208/950 |
| 2017/0348664 | A1 * | 12/2017 | Picou | G05B 6/02 |
| 2021/0348066 | A1 * | 11/2021 | Clark | G06N 3/045 |
| 2022/0299952 | A1 * | 9/2022 | Salhov | G05B 13/027 |

* cited by examiner

*Primary Examiner* — Jonathan Miller
(74) *Attorney, Agent, or Firm* — Phillips 66 Company

(57) ABSTRACT

Processes and systems that control operation of a commercial refinery distillation column and/or splitter operable to separate hydrocarbons. An automated process controller (APC) receives signal from at least one analyzer that provides information about the concentration of at least a first chemical in a first fraction and a second chemical in a second fraction obtained from the distillation column. The APC comprises programming in the form of an algorithm that calculates real-time monetary values for the first chemical and the second chemical and alters the operation of the distillation column to change either the percentage of the first chemical in the second fraction or the percentage of the second chemical in the first fraction, thereby maximizing overall operational profit for the distillation column.

8 Claims, 5 Drawing Sheets

SYSTEMS FOR CONTROLLING FRACTIONATION USING DYNAMIC COMPETING ECONOMIC OBJECTIVES

CROSS-REFERENCE TO RELATED APPLICATIONS

This application is a non-provisional application which claims the benefit of and priority to U.S. Provisional Application Ser. No. 63/292,807 filed Dec. 22, 2021, entitled "Systems for Controlling Fractionation Using Dynamic Competing Economic Objectives," and U.S. Provisional Application Ser. No. 63/292,794 filed Dec. 22, 2021, entitled "Controlling Fractionation Using Dynamic Competing Economic Objectives," both of which are hereby incorporated by reference in their entirety.

STATEMENT REGARDING FEDERALLY SPONSORED RESEARCH OR DEVELOPMENT

None.

FIELD OF THE INVENTION

The present invention relates to processes and systems for controlling operation of a commercial refinery distillation unit and/or splitter operable to separate hydrocarbons.

BACKGROUND

In the petroleum refining and petrochemical industry, direct implementation of economic objectives into online optimizers and controllers often involves either a lack of clear objectives, competing objectives, non-linear nature of the objectives and/or an inability to operate a given process to achieve optimal profit due to an inability to dynamically calculate the monetary value of various product streams (especially intermediate streams) that are derived from a given process or separation. The problem is made more complex when the process (or separation) producing more of a first product stream having a first dynamically changing monetary value decreases the production of a second product (or intermediate) stream having a second dynamically changing monetary value.

Methods and systems are needed that can overcome these challenges by dynamically calculating the fluctuating monetary value of various intermediate products derived from the fractions produced by a given distillation unit. This can be achieved by implementing a strategy for the dynamic calculating of a monetary value for one or more classes of intermediate products (optionally in combination with final products) produced by the distillation column. The monetary value of intermediate products is derived in a novel approach by quantifying their contribution to the final product pool via linking the value these intermediate products to final products having known (although fluctuating) market values.

In some embodiments, a dynamic monetary value is intermittently, or periodically, calculated for naphthenes (based upon their intermediate product market value as benzene precursors) as well as C6 iso-paraffins (based upon their current market value as gasoline blend stock, which is in turn derived from the current market price of gasoline). These dynamic monetary values are utilized as two of several data variables to an algorithm that intermittently calculates (optionally, in "real-time" or "near real-time") the operating settings of a distillation unit that provides maximum overall economic profit at the time of the calculation. The results of the calculation inform the adjustment of operating settings for the distillation unit operation to achieve maximum profit operational profit. Certain embodiments of the present inventive processes and systems employ a model-based predictive controller (MPC) to dynamically identify the optimal DIH operating solution given current pricing of the produced distillation fractions, the feedstock used and current column conditions. The novel principles described herein can also be applied to other types of distillation column in a modern petroleum refinery.

BRIEF SUMMARY OF THE DISCLOSURE

Some embodiments comprise a process for operating a refinery distillation unit, the process comprising: (a) directing a feed stream comprising a mixture of hydrocarbons, the hydrocarbons having a boiling point that is in the range from 45° C. to 85° C. (at 1 atm), alternatively from 50° C. to 82° C., into a distillation unit that separates hydrocarbons according to their boiling point to produce at least a first fraction that leaves the distillation unit via first outlet and a second fraction that leaves the distillation unit via second outlet, where the first fraction has an average boiling point (at 1 atm) that is less than the average boiling point (at 1 atm) of the second fraction, where the first fraction comprises at least a first chemical that comprises a first monetary value (per unit) and the second fraction comprises at least a second chemical comprising a second monetary value (per unit), where the first chemical does not completely segregate into the first fraction and the monetary value of the percentage (mol %) of the first chemical that does not segregate into the first fraction is zero, where the second chemical does not completely segregate into the second fraction and the monetary value of the percentage (mol %) of the second chemical that does not segregate into the second fraction is zero; (b) separating the feed stream in the distillation unit to produce the first fraction and the second fraction; (c) determining the percentage (mol %) of the first chemical that leaves the distillation unit in the first fraction and the percentage (mol %) of the second chemical that leaves the distillation unit in the second fraction; (d) calculating a total profit obtained from the separating by multiplying a first chemical price consisting of the monetary value (per unit) of the first chemical by the percentage (mol %) of the first chemical in the first fraction, then adding to this the product of a second chemical price consisting of the monetary value (per unit) of the second chemical multiplied by the percentage (mol %) of the second chemical in the second fraction, where the first chemical price is selected from one of: 1) a first chemical commercial price and 2) a first product commercial price multiplied by the conversion efficiency from the first chemical to the first product, where the first product is derived from the first chemical; where the second chemical price is selected from one of: 1) a second chemical commercial price and 2) a second product commercial price multiplied by the conversion efficiency from the second chemical to the second product, where the second product is derived from the second chemical; (e) intermittently performing the calculating of (d) with an algorithm to find a solution cut point temperature that produces a maximum total profit from the separating at the time the calculating is performed, where the solution cut point temperature corresponds to known operating settings for the distillation unit, where the first chemical price and the second chemical price are variable and can change between iterations of the calculating; (f) adjusting the known operating settings of (e) to the distillation unit, where the adjusting comprises altering one or more operating parameters to change the distillation unit cut point temperature to the solution cut point temperature, where the operating parameters are selected from one or more of: the temperature of the heated feed stream entering the distillation unit, quantity of heat input to the reboiler and flow rate of the light fraction leaving the distillation unit, where the adjusting alters at least one of: the percentage of the first chemical that exits the distillation unit in the first fraction and the percentage (mol %) of the second chemical that exits the distillation unit in the second fraction.

In some embodiments of the process, parts (d) and (e) are performed by a model predictive control algorithm. Some embodiments of the process comprise intermittently performing the calculating occurs in a range from once per 0.01 sec to once per day, alternatively from once per minute to once per hour.

In some embodiments, the first chemical is a class of chemical selected from C6 isoparaffins and n-paraffins and the second chemical is a class of chemical selected from at least one of C6 naphthenes and benzene.

In some embodiments, the feed stream is selected from a straight run light naphtha stream derived from an atmospheric distillation unit, a naphtha stream derived from a hydrocracker and a naphtha stream derived from a hydrotreater.

In some embodiments, the feed stream additionally comprises a third chemical that segregates into the second fraction and comprises a third monetary value (per unit), where the third chemical does not completely segregate into the second fraction and the monetary value of the percentage (mol %) of the third chemical that does not segregate into the second fraction is zero, where the determining of (c) additionally finds the percentage (mol %) of the third chemical that leaves the distillation unit in the second fraction, where the calculating of the total profit in (d) additionally comprises adding the product of a third chemical price consisting of the monetary value (per unit) of the third chemical multiplied by the percentage (mol %) of the third chemical in the second fraction, where the third chemical price is determined by one of 1) a commercial price for the third chemical or 2) a commercial price for a third product derived from the third chemical multiplied by the conversion efficiency from the third chemical to the third product, where the third chemical price is a variable and can change between iterations of the calculating.

Some embodiments comprise a system for separating a petroleum refinery hydrocarbon stream, comprising: (a) a refinery distillation unit operable to receive a feed stream comprising a mixture of hydrocarbons that have a boiling point that is in the range from 45° C. to 85° C. (at 1 atm), alternatively from 50° C. to 82° C., (at 1 atm) and further operable to separate the hydrocarbons according to their boiling point to produce at least a first fraction that leaves the distillation unit via first outlet and a second fraction that leaves the distillation unit via second outlet, where the first fraction has an average boiling point (at 1 atm) that is less than the average boiling point (at 1 atm) of the second fraction, where the first fraction comprises at least a first chemical that comprises a first monetary value (per unit) and the second fraction comprises at least a second chemical comprising a second monetary value (per unit), where the first chemical does not completely segregate into the first fraction and the monetary value of the percentage (mol %) of the first chemical that does not segregate into the first fraction is zero, where the second chemical does not completely segregate into the second fraction and the monetary value of the percentage (mol %) of the second chemical that does not segregate into the second fraction is zero; (b) at least one analyzer operable to determine the percentage (mol %) of the first chemical that leaves the distillation unit in the first fraction and the percentage (mol %) of the second chemical that leaves the distillation unit in the second fraction and further operable to send that data to a process controller; (c) a process controller operable to receive the data from the at least one analyzer and calculate a solution cut point temperature that achieves maximum total profit from operation of the distillation unit, where the process controller is further operable to adjust operating settings for the distillation unit that effect the calculated solution cut point temperature, where the process controller comprises a processor and memory that contains programming executed by the processor, where the programming comprises an algorithm operable to calculate the solution cut point temperature that achieves the maximum total profit obtained from the separating of the first chemical from the second chemical in the distillation unit, where the solution cut point temperature corresponds to known operating parameters for the distillation unit, where the programming further comprises instructions executed by the processor that implements the known operating parameters corresponding to the solution cut point temperature via control of one or more devices to alter one or more operating parameters to change the distillation unit cut point temperature to the solution cut point temperature to alter the percentage of the first chemical that exits the distillation unit in the first fraction and the percentage (mol %) of the second chemical that exits the distillation unit in the second fraction, where the operating parameters are selected from one or more of: the temperature of the heated feed stream entering the distillation unit, quantity of heat input to the reboiler and flow rate of the light fraction leaving the distillation unit, where the one or more devices is selected from: a valve operable to regulate flow of the feed stream into the distillation unit, a reboiler heater or valve operable to regulate entry of steam into the reboiler and a valve operable to regulate flow of the light fraction out of the distillation column, where a total profit from operation of the distillation unit at a given cut point temperature comprises multiplying a first chemical price consisting of the monetary value (per unit) of the first chemical by the percentage (mol %) of the first chemical in the first fraction, then adding to this the product of a second chemical price consisting of the monetary value (per unit) of the second chemical multiplied by the percentage (mol %) of the second chemical in the second fraction, where the first chemical price is selected from one of: 1) a first chemical commercial price and 2) a first product commercial price multiplied by the conversion efficiency from the first chemical to the first product multiplied by the cost (per unit) to convert the first chemical to the first product, where the first product is derived from the first chemical; where the second chemical price is selected from one of: 1) a second chemical commercial price and 2) a second product commercial price multiplied by the conversion efficiency from the second chemical to the second product multiplied by the cost (per unit) to convert the second chemical to the second product, where the second product is derived from the second chemical.

In some embodiments of the system, the process controller is a model predictive controller.

In some embodiments of the system the process controller is operable to calculate a solution cut point temperature at a frequency in a range from once per 0.01 sec to once per day.

In some embodiments of the system the process controller is operable to calculate a solution cut point temperature at a frequency in a range from once per minute to once per hour.

In some embodiments of the system, the first chemical is a class of chemical selected from C6 isoparaffins and n-paraffins and the second chemical is a class of chemical selected from at least one of C6 naphthenes and benzene.

In some embodiments of the system, the first chemical price and the second chemical price are variables.

In some embodiments of the system, the at least one analyzer is selected from a temperature sensor, a mass spectrometer, an UV spectrometer, an infrared spectrometer, an NMR spectrometer and a spectrophotometer.

In some embodiments of the system, the first chemical is a class of chemical selected from C6 isoparaffins and n-paraffins and the second chemical is a class of chemical selected from at least one of C6 naphthenes and benzene.

In some embodiments of the system the feed stream is selected from a straight run light naphtha stream derived from an atmospheric distillation unit, a naphtha stream derived from a hydrocracker and a naphtha stream derived from a hydrotreater.

BRIEF DESCRIPTION OF THE DRAWINGS

A more complete understanding of the present invention and benefits thereof may be acquired by referring to the follow description taken in conjunction with the accompanying drawings in which.

Figure 1:
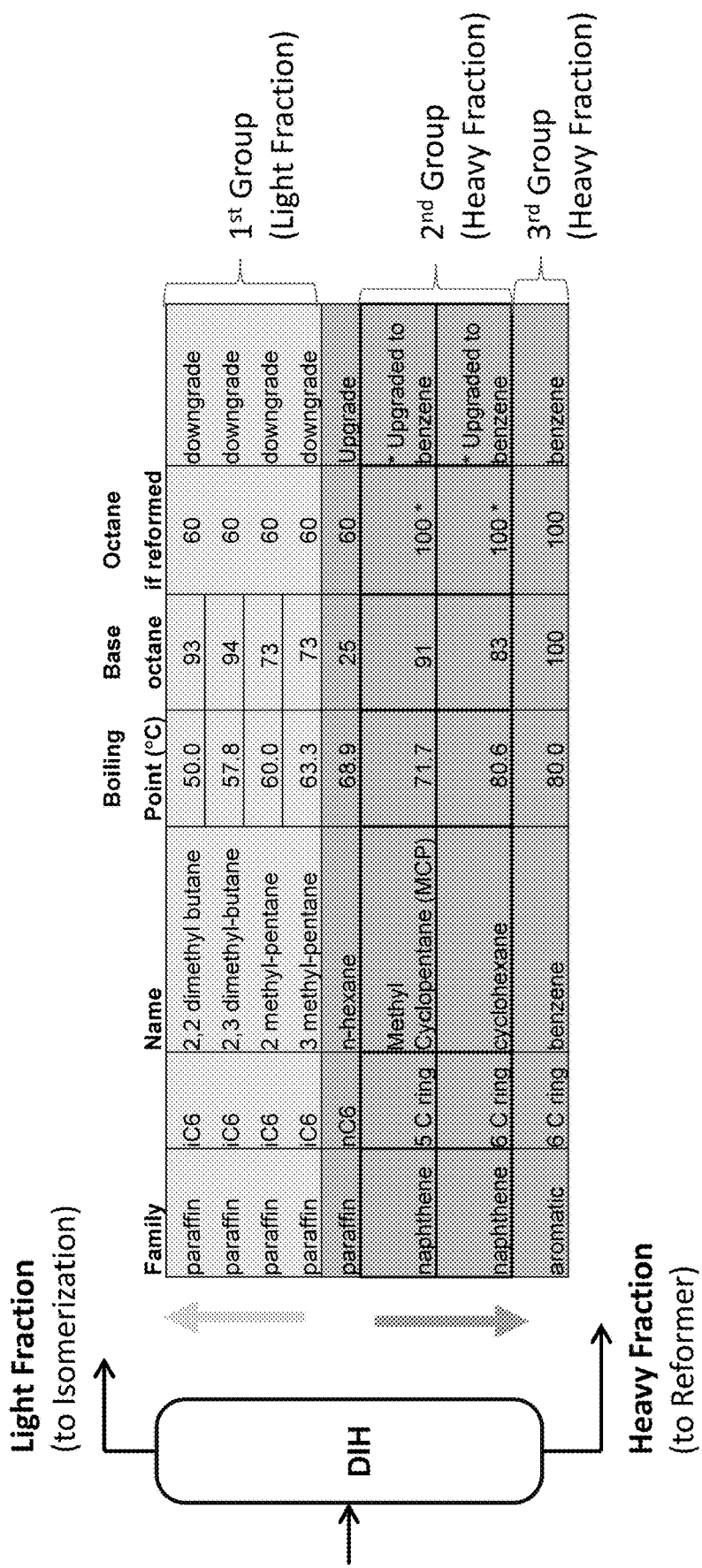
FIG. 1 is a table demonstrating the separation of various chemical compounds in a deisohexanizer.

The invention is susceptible to various modifications and alternative forms, specific embodiments thereof are shown by way of example in the drawings. The drawings may not be to scale.

DETAILED DESCRIPTION

A commercial refinery linear planning model is a high-level or global refining model that accounts for the molecular composition of the petroleum feedstock and attempts to maximize economic value obtained from that feedstock based on a group of decision variables (variables that determine the final output) where the decision variables are subject to certain constraints.

The design of commercial distillation units varies greatly, and such units possess different separation efficiencies when separating two or more hydrocarbon compounds of interest. The present inventive processes and systems are advantageously applied to instances where a commercial distillation unit does not efficiently separate at least two distinct hydrocarbon compounds of interest (or classes of hydrocarbon compounds) that are present in the feed stream into at least two distinct distillation fractions. In such instances, the present process dynamically adjusts the operating conditions (e.g., feed rate, reboiler duty, flow rate from the top of the unit) of the distillation unit to provide the greatest profit based upon the dynamically updated monetary value of each hydrocarbon compound of interest. The hydrocarbon compounds that are separated can be either finished products having an established monetary value (including, but not limited to, benzene) or product intermediates that have inherent value as feedstock for catalytic upgrading of the product intermediate to one or more product(s) having monetary value.

A first embodiment of the inventive process comprises a deisohexanizer (DIH) distillation unit in a petroleum refinery and a model predictive control (MPC) controller that comprises programming for dynamically controlling the separation of at least two hydrocarbon compounds (or classes of hydrocarbon compounds) by the DIH distillation unit. DIH units are utilized in multiple locations within a typical commercial petroleum refinery, including downstream from an atmospheric distillation unit (Crude Unit), as a component of hydrotreating units (downstream from a coker), downstream from an isomerization unit and downstream from a saturated gas plant.

The feed stream to a refinery DIH unit typically comprises paraffins, naphthenes and aromatics containing six carbon atoms (C6) that are grouped into three groups by boiling point (see FIG. 1). The lightest group mostly comprises branched C6 iso-paraffins (iC6) with a boiling point of about (65.56° C.) or less (iC6 lights). The second group mostly comprises n-hexane (nC6) and C6 naphthenes that have a boiling point above 65.56° C., while the third group comprises benzene (boiling point 80° C.). The DIH typically functions to split the iC6 hydrocarbons (light fraction) from the nC6, C6 naphthenes and benzene (heavy fraction).

Figure 2:
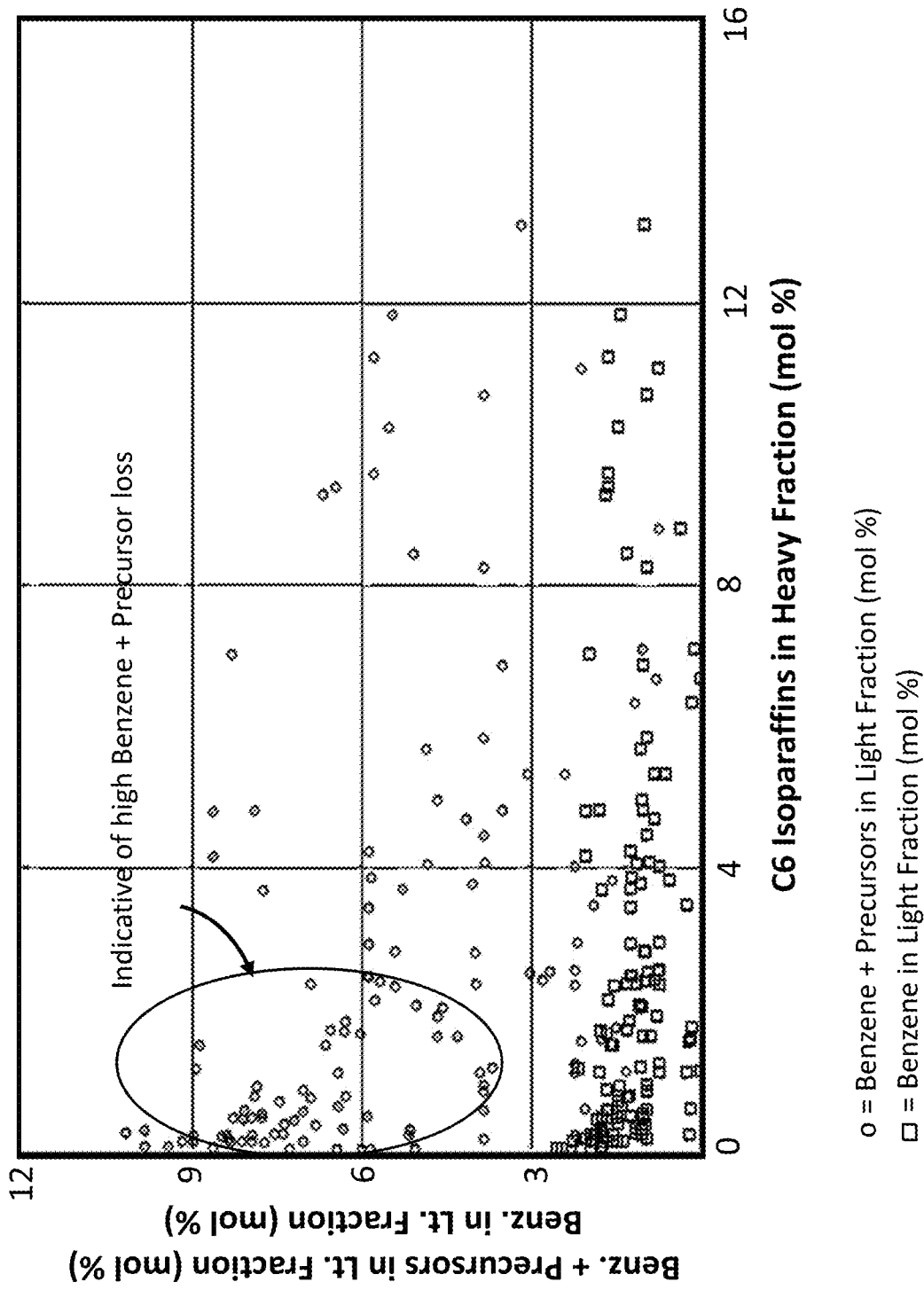
FIG. 2 is a graph demonstrating cross contamination of isoparaffins into a deisohexanizer heavy fraction and benzene (and/or naphthenes) into a deisohexanizer light fraction).

However, many existing DIH units do not conduct this separation efficiently, leading to inadvertent loss of some C6 isoparaffins as contaminants in the heavy fraction and/or loss of some n-C6 paraffins, C6 naphthenes and/or benzene into the light fraction> An example of this is shown in FIG. 2, which is a graph depicting the quantity of benzene (mol %) found as contaminant in the light fraction (y-axis) compared with iC6 paraffins found as contaminant in the heavy fraction (x-axis). The graph also depicts a much larger total loss of benzene plus benzene precursors (i.e., C6 naphthenes) found as contaminants in the light fraction in most instances, but especially when operation of the DIH unit is set to minimize the loss of iC6 paraffins into the heavy fraction (see FIG. 2, circled region of interest).

DIH unit operation is typically directed to minimize loss of only one component (or chemical class of interest), which may result in excessive loss of other chemicals (or chemical classes) of interest into an undesired fraction. This results in lost product opportunity (LPO) and does not maximize the economic profit obtained from operation of DIH distillation unit. For example, benzene can be sold directly as a chemical commodity, but C6 naphthenes also have value as intermediate products that can be aromatized to benzene. Loss of benzene or C6 naphthenes into the iC6 lights fraction therefore decreases overall economic profit obtained from the DIH distillation fractions. Conversely, isoparaffins in the iC6 lights fraction also have an economic value, typically as a blend component of gasoline. Loss of these isoparaffins into the heavy fraction therefore results in a loss of isoparaffins available as gasoline blend stock and a consequent decrease in both reformer yield (due to an unfavorable feed) and economic profit derived from the lost isoparaffins.

Finding the maximum economic profit from operating a DIH unit at any given moment necessitates placing a dynamic economic value on each distillation fraction based upon designated target molecules (or classes of molecule) in each distillation fraction. The calculated economic value of each target molecule can be updated in real time (or near real time), allowing a process controller to alter the operating parameters of the DIH unit with the objective to either a) decrease loss of benzene and benzene precursors into the light fraction when benzene commodity price is high, or alternatively b) minimize loss of C6 isoparaffins into the heavy fraction when the gasoline market commodity price is high, as isoparaffins monetary value is based upon their value as gasoline blend stock, which is derived from the commercial commodity price of gasoline at the time of the calculation. The ability to dynamically adjust operation of the DIH unit in real time (or near real time) is based upon intermittently updated monetary values for two or more target molecules (or classes of molecule) using an economic objective that allows the refinery operator to maximize overall profit from operation of the DIH unit.

The general process comprises an algorithm that is calculated at cyclic time intervals by the process controller for an individual distillation unit. The algorithm calculates the operational settings for the distillation unit that produce the maximum profit for operating the distillation unit during a given time period. The overall objective is to minimize lost product opportunity for two or more target molecules (or target classes of molecule) due to contamination of a first distillation fraction with molecules that would provide more profit if they were retained by a second distillation fraction. The algorithm conducts intermittent updates of the operational settings that achieve maximum profit based on fluctuating monetary value (i.e., market prices) for the contents of one or more distillation fractions obtained from the distillation unit. In this context, the term "intermittent" can be interpreted as being in the range from one or more times per day, including hourly, one or more times per hour, one or more times per minute and one or more times per second. Generally, the time intervals between intermittent execution of the algorithm by the controller are equal.

In an embodiment comprising a DIH unit, an algorithm calculates a first term comprising: the light fraction volume (as a percentage of the DIH feed stream volume) multiplied by benzene percentage (mol %) in the light fraction multiplied by the most recent commercial commodity price for benzene (1), restated as:

(light frac. vol.*benzene % in light frac*benzene monetary price)

To this first term the algorithm adds a second term comprising: the light fraction volume (vol %) as a percentage of the DIH feed stream volume) multiplied by the percentage of total cyclohexane (mol %) in the light fraction multiplied by the calculated conversion rate of cyclohexane to benzene in the refinery multiplied by the most recent monetary value of benzene (determined as benzene commercial commodity price), restated as:

light frac. vol. (vol %)*cyclohex. in light frac. (mol %)*cyclohex. to benzene conv. rate*benzene commodity price For this second term, the conversion rate of the cyclohexane to benzene is determined by a refinery-wide computer simulation calibrated by actual DIH unit and reformers operational data. The monetary value for benzene is updated to the most recent value available each time the algorithm calculates the DIH unit operational settings that produce the maximum operational profit.

To the first and second term, the algorithm adds a third term comprising the heavy fraction volume (as a percentage of the DIH feed stream volume) multiplied by the percentage of total molecules with a boiling temperature of 65.6° C. or less (65.6° C.–) that are found in the heavy fraction (mol %) multiplied by the consequent percentage of gasoline loss (in bbl) multiplied by the most recent commodity price differential for gasoline versus the most recent market commodity price for liquified petroleum gas (LPG), restated as:

heavy frac. vol (vol %)*65.6° C.–%*gasoline vol loss*(gasoline commodity price–LPG commodity price)

In this third term, the LPG commodity price is subtracted from the gasoline commodity price because any molecules with a boiling temperature of 65.6° C. or less (65.6° C.–) that are found in the heavy fraction will be sent to a reformer and converted into products that can be sold as LPG.

For this third term the gasoline volume loss is determined by a refinery-wide computer simulation calibrated by actual DIH unit and downstream reformer(s) operational data. The commodity price for gasoline is updated to the most recent value available each time that the algorithm calculates the DIH unit operational settings that produce the maximum monetary profit, or in other words, the optimal targets for either loss of benzene into the light fraction (blended into gasoline) or loss of 150° F.– compounds into the heavy fraction.

In some embodiments, an additional fourth term is added that is similar to the second term except that is calculates the monetary loss (or lost product opportunity) associated with loss of methyl-cyclopentane (another benzene precursor) into the light fraction. The fourth term would comprise: the light fraction volume (vol %) as a percentage of the DIH feed stream volume) multiplied by the percentage of total methyl-cyclopentane (mol %) in the light fraction multiplied by the calculated conversion rate of methyl-cyclopentane to benzene in the refinery multiplied by the most recent monetary value of benzene (determined as benzene commercial commodity price):

light frac. vol. (vol %)*methyl-cyclopentane in light frac. (mol %)*methyl-cyclopentane to benzene conv. rate*benzene price For this fourth term, the conversion rate of the methyl-cyclopentane to benzene is determined by a refinery-wide computer simulation calibrated by actual DIH unit operation data. The monetary value for benzene is updated to the most recent commodity price (preferably a real-time or near-real time price) available each time the algorithm calculates the DIH unit operational settings that produce the maximum operational profit.

In some embodiments, the execution of the algorithm is carried out by a linear model predictive process controller (MPC) comprising a memory containing the programming that comprises the algorithm and a computer processor for periodically executing the algorithm programming. The MPC further comprises programming instructions that allow the MPC to alter operational settings of the distillation unit when needed to achieve the maximum operational profit as calculated by the algorithm. Model predictive control is a well-established technology for advanced process control in many industrial applications.

Each time the algorithm is run by the process controller, a determination is made whether a change in operational settings of the DIH unit would increase overall monetary profit from operation of the DIH distillation unit based upon the latest updates to the market commodity prices for benzene and gasoline. It is important to emphasize that DIH units vary significantly in their design and separation efficiency. As a result, it is possible for the inventive process to produce very different distillation unit operational settings to achieve maximum operational profit in distillation units having different structural designs, and consequent differences in separation efficiency for chemicals of interest in the distillation feed stream, even when the current market commodity value/price of the various fractions (e.g., benzene, gasoline, etc.) is equal.

Figure 3:
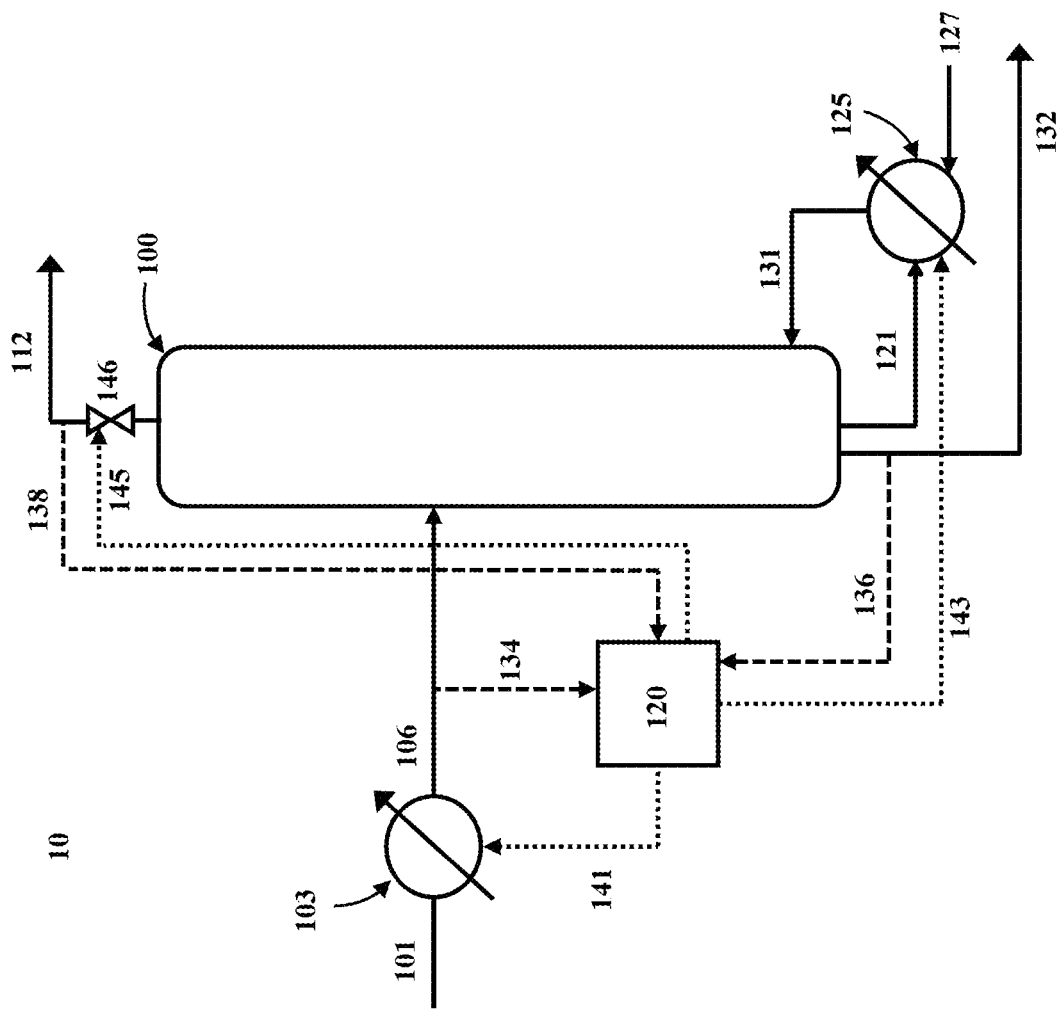
FIG. 3 is a schematic diagram representing one embodiment of the inventive processes and systems.

A first embodiment of the inventive system and process is illustrated by the flow diagram of FIG. 3. A deisohexanizer (DIH) unit 100 receives a feed stream 101 comprising alkanes, naphthenes and aromatics. The feed stream predominantly comprises hydrocarbons containing six carbon atoms, but the feed stream 101 may additionally comprise hydrocarbons ranging from 4-10 carbon atoms. In certain embodiments, the feed stream 101 may be a straight run light naphtha stream derived from an atmospheric distillation unit (i.e., crude unit). Alternatively, the feed stream may comprise a naphtha stream derived from a hydrocracker or hydrotreater. The feed stream 101 passes through a feed heater 103 that heats the feed stream 101 to produce a heated feed stream 106 that passes through adjustable valve 110 and into the DIH unit 100. Feed heater 103 heats feed stream 101 to a temperature that facilitates separation of the heated feed stream 106 into at two fractions in the DIH unit 100. The DIH unit 100 separates the compounds in the heated feed stream 106 according to their boiling point, to produce a light fraction 112 mostly comprising molecules that have a boiling point of 150° F. (65.56° C.) or less at atmospheric pressure and a heavy fraction (not depicted) comprising molecules having a boiling point greater than 150° F. (65.56° C.) at atmospheric pressure (101.325 kPa). A portion of the heavy fraction (not depicted) becomes reboiler fraction 121 that passes into reboiler 125. Reboiler 125 accepts at least one heat input 127 that may comprise steam or any other method of heating. Reboiler 125 heats reboiler fraction 121 to a temperature that allows reboiler fraction 121 to re-vaporize and pass via conduit 131 back to the DIH unit 100. Eventually, a heavy product fraction 132 leaves DIH unit 100.

The system and process of the first embodiment further comprises a process controller 120 that automatically controls operation of the DIH unit 100 in response to input signals (134, 136, 138) from various sensors that indicate the efficiency with which the DIH unit 100 is separating the light fraction 112 from the heavy product fraction 132. Speaking generally, sensors that provide information to the process controller may include (but is not limited to) one or more of: a temperature sensor, a pressure sensor, a spectrophotometer, a UV or IR spectrometer, an NMR spectrometer and a mass spectrometer. Such sensors may be located in the distillation unit and reboiler or in in conduits leading to or from the distillation unit and reboiler. In some embodiments, estimates of the efficiency of the distillation separation may comprise the use of "soft sensors" to indirectly estimate separation efficiency based on measurements of related variables. Often, multiple indirect measurements are used along with data-driven or first-principles models to construct the soft sensor-based measurement. These inferential measurements may require calibration to provide accurate quantitative information for the variables of interest and may be used in conjunction with estimation algorithms to provide real-time updates on the efficiency of the separation. As a general non-limiting example, the input from a temperature sensor measurement can provide inferential temperature data from a variety of locations in the system that allow the process controller to infer the current efficiency of separation by the DIH unit (i.e., the degree of cross-contamination). The operation of such systems is well-established in the field, and therefore more detailed description is outside the scope of the present disclosure.

Again considering the embodiment of FIG. 3, in response to the input signals (134, 136, 138) received and the results of an algorithmic calculation performed by the process controller 120, the process controller 120 sends electrical signals (141, 143, 145) to one or more components of the system if needed in order to affect the quantity of as well as the quality of the separation between molecules in the feed stream that have a boiling point of 65.56° C. or less (at 1 atm) versus a boiling point of greater than 65.56° C., and thereby improve overall operational profit. The one or more electrical signals (141, 143, 145) alters one or more operating parameters for the DIH unit, that may include (but are not limited to): a signal 141 to control operation of heater 103 to control the temperature of the heated feed stream 106 entering the DIH unit 101, a signal 143 that controls the heat input to the reboiler 125 (by adjusting the rate of steam entry into the reboiler), a signal 145 to control operation of a valve 146 that control flow rate of the light fraction 112 leaving the DIH unit 100. The sum of the changes to one or more operational parameters is to change the DIH unit cut point temperature to a solution cut point temperature that provides maximum monetary profit from operation of the DIH unit.

The process controller 120 comprises ROM memory that stores the algorithm and a processor and RAM memory that executes the algorithm periodically (or intermittently) using the most recent commercial commodity prices available for benzene and gasoline (and inferred monetary value of product intermediates such as cyclohexane and MCP) in order to determine the optimal parameter settings needed to provide maximum monetary profit from the operation of the DIH unit. Based upon the calculated result, the process controller 120 adjusts zero, one or multiple parameter(s) to achieve maximum monetary profit from operation of the DIH unit at the time of the calculation. In some embodiments, the algorithm may be intermittently executed (or run) at a time interval in the range from once per 0.1 sec to once per day, alternatively in the range from once per second to once per hour, alternatively in the range from once per second to once per minute.

A second exemplary embodiment comprises a naphtha splitter unit that produces a light fraction comprising paraffins that is directed to a naphtha isomerization unit and a heavy fraction that is directed to a naphtha reformer. Overall economics are maximized by accounting for the unique chemistry of each molecule class in the two downstream units.

One application of the embodiment is in benzene management. Benzene is regulated in gasoline at low levels (typically <1 vol %), and naphtha reformers can be a significant source of gasoline pool benzene. As mentioned above, benzene predominantly remains unconverted in the naphtha reformer, while C6 naphthenes (methylcyclopentane and cyclohexane) are selectively converted to benzene. Raising the cut point temperature for a naphtha splitter where the heavy fraction is directed to a naphtha reformer can decrease the quantity of C6 naphthenes in the naphtha reformer feed, instead diverting them to an isomerization unit. This approach also increases the concentration of C6 paraffins (both n- and iso-isomers) going to the isomerization unit, where they show substantially better octane uplift than in the reformer. Finally, any benzene directed to the light fraction is saturated in the isomerization unit, reducing overall gasoline pool benzene levels.

However, raising the naphtha splitter cut point comes with an economic trade-off in that C6 cyclic hydrocarbons (naphthenes and benzene) typically inhibit isomerization catalysts, requiring higher temperature in the isomerization reactor to achieve the same catalytic isomerization yield. Increased reactor temperatures lead to decreased yield performance for the isomerization unit over the long term. An additional disadvantage of increasing the cut point temperature is the transfer of C7 paraffins from reformer feed, where they show reasonable selectivity to high value toluene, to the isomerization unit, where they show high cracking rates to low value C4− materials.

The inventive processes and systems described herein can combine the competing economic objectives for the reforming and isomerization units to maximize overall monetary profit objective, thereby balancing the economics of yield loss in the isomerization unit to the economic benefits of decreasing benzene production. This tradeoff can then be compared with other options for reducing reformate benzene levels; examples include purchasing of benzene credits, reducing reformer rates, and reducing reformer severity.

One of many advantages of the present processes and systems is that a nonlinear objective formula can be implemented utilizing a conventional linear model predictive controller (MPC). To achieve that, dynamic linear coefficients are directly adopted from the multiple dynamic competing economic objectives and applied into a MPC online controller, which typically uses only constant linear coefficients. This novel approach opens a new way of achieving non-linear optimization and control. Overall, the novel implementation of dynamic competing economic valuations for two or more chemicals (or chemical classes) of interest can be implemented using an MPC-based controller, where any chemical product (or intermediate product) of interest is considered to have zero monetary value if it is not retained in the desired distillation fraction.

EXAMPLES

The following non-limiting examples are provided to further illustrate aspects described herein. However, the examples are not intended to be all-inclusive and are not intended to limit the scope of the aspects described herein. The particular materials and amounts thereof, as well as other conditions and details recited in these examples should not be used to limit the implementations described herein.

Example 1

In a first example demonstrating a calculation of competing economic objectives for multiple chemicals of interest that are divided into different fractions by a distillation unit. As described previously, in an embodiment comprising a DIH distillation unit, the process comprises calculating a first term:

(light fraction vol.)×(benzene % in light fraction)× (Benzene monetary value)

where the light fraction volume (as a percentage of the DIH feed stream volume) is multiplied by benzene percentage (mol %) in the light fraction multiplied by the most recent commercial commodity price for benzene (=Benzene price/bbl). In a first hypothetical example, at a first time point this first equation is represented as:

(55 vol. %)×(1.3 vol %)×($138/bbl)

The second term comprises:

light frac. vol. (vol %)*cyclohexane in light frac. (mol %)*cyclohexane to benzene conv. rate*benzene price/bbl where the light fraction volume (as a percentage of the DIH feed stream volume) is multiplied by the percentage of cyclohexane (mol %) in the light fraction multiplied by the calculated conversion rate of cyclohexane to benzene in the refinery multiplied by the most recent commercial commodity price for gasoline, restated as:

(55 vol %)×(0.2 vol %)×(82 mol %)×$50 bbl

For this second term, the conversion rate of the cyclohexane to benzene is determined by a refinery-wide computer simulation calibrated by actual DIH unit operation data. The process updates the commercial commodity price for benzene to the most recent market price available each time the algorithm calculates the DIH unit operational settings that produce the maximum operational profit.

To the first and second term, the algorithm adds a third term comprising:

heavy frac. vol (vol %)*65.6° C.−%*gasoline vol loss*(gasoline commodity price−LPG commodity price)

which is the heavy fraction volume (as a percentage of the DIH feed stream volume) multiplied by the percentage of total molecules with a boiling temperature of 65.6° C. or less (65.6° C.−) that are found in the heavy fraction (mol %) multiplied by the consequent percentage of gasoline loss (in bbl) multiplied by the most recent monetary value for gasoline minus the most recent commodity price for LPG. In the present example, these values are:

(45 vol. %)×(3.0 vol %)×(3.0 vol %)×($50/bbl−$25/bbl)

The LPG commodity price is subtracted from the gasoline commodity price because any molecules with a boiling temperature of 65.6° C. or less (65.6° C.−) that are found in the heavy fraction will be sent to a reformer and converted into products that can be sold as LPG, which in this example, is priced at $25/bbl.

For this third term the gasoline volume loss is determined by a refinery-wide computer simulation calibrated by actual DIH unit operation data. The monetary value for gasoline is updated to the most recent value available each time that the algorithm calculates the DIH unit operational settings that produce the maximum profit, or in other words, the optimal targets for either loss of benzene into the light fraction (blended into gasoline) or loss of 150° F.− compounds into the heavy fraction.

In this example, an additional fourth term is added that is similar to the second term, except that is calculates the monetary loss (or lost product opportunity) associated with loss of methyl-cyclopentane (another benzene precursor) into the light fraction. This fourth term comprises: the light fraction volume (vol %) as a percentage of the DIH feed stream volume) multiplied by the percentage of total methyl-cyclopentane (mol %) in the light fraction multiplied by the calculated conversion rate of methyl-cyclopentane to benzene in the refinery multiplied by the most recent monetary value of benzene (determined as benzene commercial commodity price):

light frac. vol. (vol %)*methyl-cyclopentane in light frac. (mol %)*methyl-cyclopentane to benzene conv. rate*benzene price For this fourth term, the conversion rate of the methyl-cyclopentane to benzene is determined by a refinery-wide computer simulation calibrated by actual DIH unit operation data. The monetary value for benzene is updated to the most recent value available each time the algorithm calculates the DIH unit operational settings that produce the maximum operational profit. For this example, the values for this fourth term are:

(55 vol %)×(0.1 vol %)×(80 mol %)×$50 bbl

The sum of all four terms represents the total LPO at the current operational settings for the column. The process can further comprise prior operational data for the DIH unit showing correlations between adjustment of operating settings and the loss of gasoline blend stock into the heavy fraction, benzene and cyclohexane into the light fraction and use this data to adjust operational settings of the unit to achieve maximum monetary profit. In alternative embodiments, the process comprises receiving input from one or more analyzers that provide data in near real-time on the content of gasoline blend stock into the heavy fraction and/or benzene and cyclohexane into the light fraction. This information can be utilized by the process (optionally in conjunction with the correlative operational data mentioned above) to adjust the operational settings of the unit to achieve maximum monetary profit.

Example 2

Figure 4:
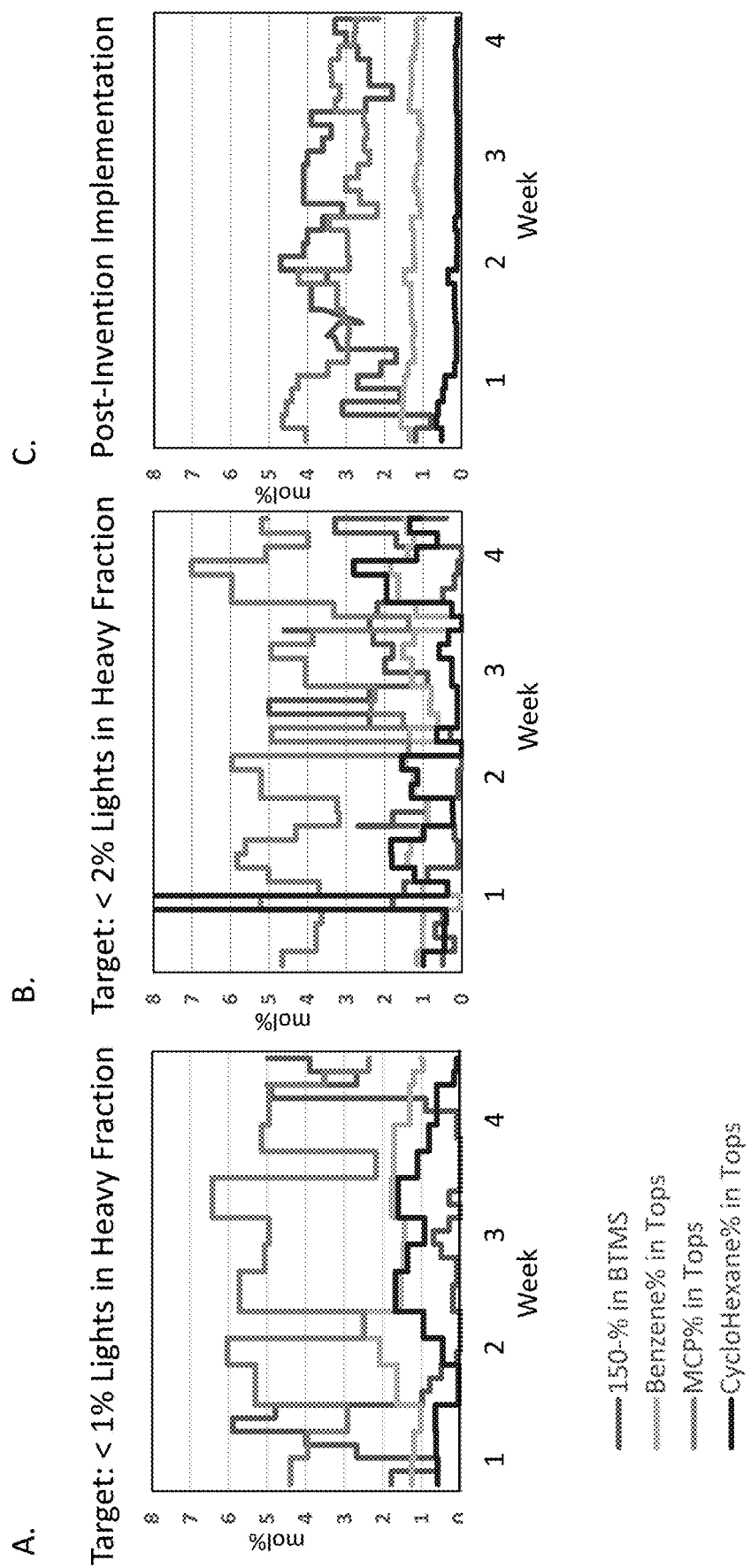
FIG. 4 shows three graphs depicting levels of cross-contamination for several chemicals of interest over a 30-day period before and after implementation of a disclosed embodiment.

A second example of the operation of the inventive process and system is shown in FIG. 4. The graphs depicted in FIG. 4a (left) and FIG. 4b (middle) shows the separation of several chemical components by a DIH unit in a commercial refinery setting over a period of 30 days, and prior to implementation of the inventive process and system. In FIG. 4a, the DIH column was manually set to maintain a target of less than 1 mol % of C6 isoparaffins in the heavy fraction, while in FIG. 4b, the DIH column was manually set to maintain a target of less than 2 mol % of C6 isoparaffins in the heavy fraction.

FIG. 4c depicts the quantity (in mol %) of several chemical components in the same DIH unit post-implementation of the inventive process and system. Column operation was determined by periodic algorithmic calculation to determine the DIH column operational setpoints that would produce maximum overall profit from DIH unit operation. The DIH unit achieved consistently lower levels of benzene precursors (i.e., naphthenes and cyclohexane) in the light fraction based upon their determined monetary value as benzene intermediates. It is clear, however, that if the unit price of gasoline had increased significantly during the test, operational settings for the DIH unit would have been altered to allow the diversion of less C6 isoparaffins into the heavy fraction.

Example 3

Figure 5:
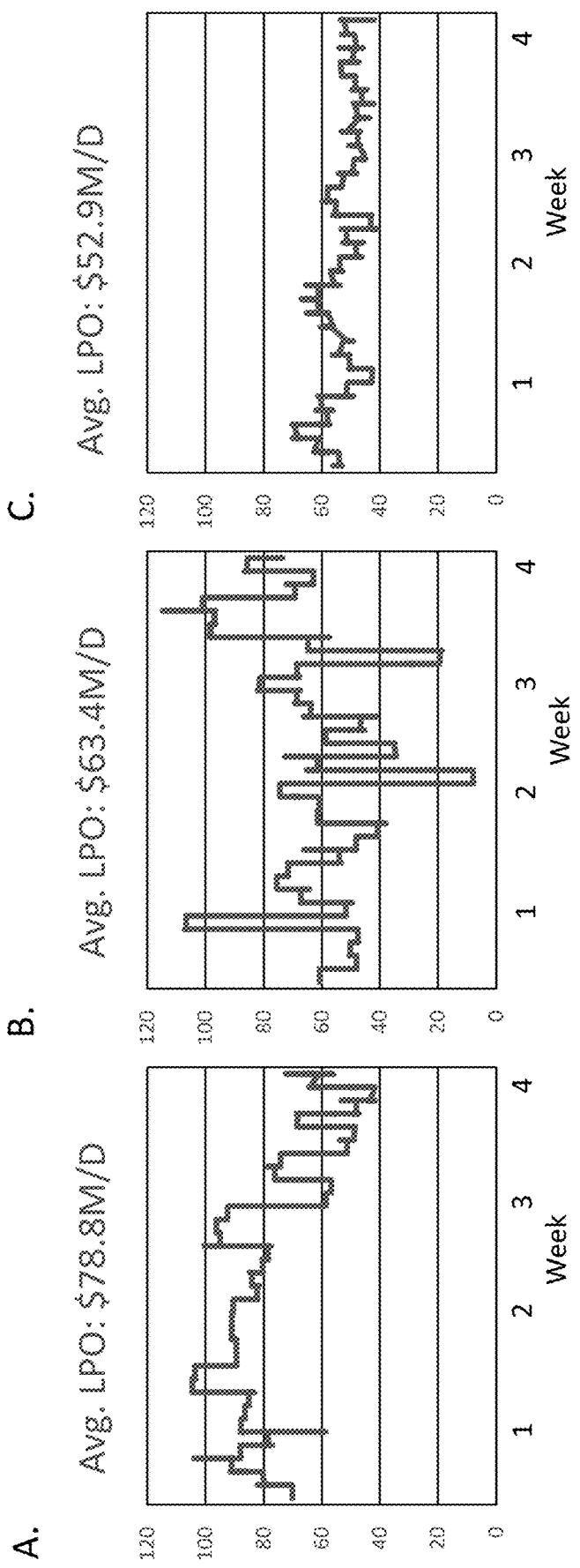
FIG. 5 shows three graphs depicting lost product opportunity (LPO) over a 30-day period before and after implementation of a disclosed embodiment.

A third example (depicted in FIG. 5) demonstrates an improvement in lost product opportunity (LPO) for operation of the same DIH column over two 30-day periods. FIG. 5A shows LPO for 30 days prior to implementation of the inventive process and system, where the DIH column was manually set to maintain a target of less than 1 mol % of C6 isoparaffins in the heavy fraction. This allowed a significant quantity of C6 benzene precursors cyclohexane and methyl-cyclopentane (MCP) to be mis-directed to the light fraction, increasing LPO. The average total LPO under these constraints was determined to be $78.8 M/D. FIG. 5B shows LPO prior to implementation of the inventive process and system where the DIH column was manually set to maintain a target of less than 2 mol % of C6 isoparaffins in the heavy fraction. While this setting decreased the overall LPO to $63.4 M/D, the graph shows significant variability in the percentage of cyclohexane, methyl-cyclopentane and benzene that was lost into the light fraction. The average percentage of benzene and benzene precursors lost into the light fraction over the 30-day test period was 6.5% (see Table 1, below).

Following implementation of the inventive process and system (see FIG. 5C), average total LPO was determined to be $52.9 M/D, reflecting an optimal balance between lost profit due to loss of gasoline blend stock into the heavy fraction and lost profit due to loss of naphthenes and benzene into the light fraction. The 30-day average percentage (vol %) of mis-directed product for several chemicals of interest is shown in Table 1 both before implementation of the inventive processes and systems (manual target of <2% of light fraction lost into heavy fraction) and after implementation.

TABLE 1

Average chemical component loss into an undesired distillation fraction over a 30-day period before implementation of the inventive process and system (second column) and after (third column)

|  | Pre-Invention (30-day Avg.) | Inventive Process (30-day Avg.) |
| --- | --- | --- |
| Light Frac, (vol. %) in Heavy Frac. | 1.2% | 3.0% |
| Benzene (vol. %) in Light Frac. | 1.1% | 1.3% |
| Cyclohexane (vol. %) in Light Frac. | 1.2% | 0.2% |
| Methyl-cyclopentane in Light Frac. | 4.2% | 3.3% |
| Tot. Benzene + Precursors in Light Frac. | 6.5% | 4.8% |

In this example, implementation of the invention led to a significant monetary savings by altering the operational settings of the DIH unit to increase the percentage of light fraction components directed into the heavy fraction while decreasing the loss of benzene and benzene precursors into the light fraction by 1.7 vol. % (see Table 1, last row). This occurred because calculations performed by the process controller that incorporated the most up-to-date monetary values for benzene and benzene precursors determined that maximum profit would be achieved by minimizing loss of these more valuable components. However, in a situation where the market price of benzene and/or gasoline fluctuated rapidly, the operational settings of the DIH unit could easily be altered based upon the most updated pricing information to produce maximum operational profit.

The descriptions of the various aspects of the present disclosure have been presented for purposes of illustration but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure can be devised without departing from the basic scope thereof.

I claim:

1. A system for separating a petroleum refinery hydrocarbon stream, comprising:
   (a) a refinery distillation unit operable to receive a feed stream comprising a mixture of hydrocarbons that have a boiling point that is in the range from 45° C. to 85° C. (at 1 atm) and further operable to separate the hydrocarbons according to their boiling point to produce at least a first fraction that leaves the distillation unit via first outlet and a second fraction that leaves the distillation unit via second outlet,
      wherein the first fraction has an average boiling point (at 1 atm) that is less than the average boiling point (at 1 atm) of the second fraction,
      wherein the first fraction comprises at least a first chemical that comprises a first monetary value (per unit) and the second fraction comprises at least a second chemical comprising a second monetary value (per unit),
      wherein the first chemical does not completely segregate into the first fraction and the monetary value of the percentage (mol %) of the first chemical that does not segregate into the first fraction is zero,
      wherein the second chemical does not completely segregate into the second fraction and the monetary value of the percentage (mol %) of the second chemical that does not segregate into the second fraction is zero;
   (b) at least one analyzer operable to determine the percentage (mol %) of the first chemical that leaves the distillation unit in the first fraction and the percentage (mol %) of the second chemical that leaves the distillation unit in the second fraction and further operable to send that data to a process controller;
   (c) the process controller operable to receive the data from the at least one analyzer and calculate a solution cut point temperature that achieves maximum total profit from operation of the distillation unit, wherein the process controller is further operable to adjust operating settings for the distillation unit that effect the calculated solution cut point temperature
      wherein the process controller comprises a processor and memory that contains programming executed by the processor, wherein the programming comprises an algorithm operable to calculate the solution cut point temperature that achieves the maximum total profit obtained from the separating of the first chemical from the second chemical in the distillation unit,
      wherein the solution cut point temperature corresponds to known operating parameters for the distillation unit, wherein the programming further comprises instructions executed by the processor that implements the known operating parameters corresponding to the solution cut point temperature via control of one or more devices to alter one or more operating parameters to change the distillation unit cut point temperature to the solution cut point temperature to alter the percentage of the first chemical that exits the distillation unit in the first fraction and the percentage (mol %) of the second chemical that exits the distillation unit in the second fraction,
      wherein the operating parameters are selected from one or more of: the temperature of the heated feed stream entering the distillation unit, quantity of heat input to a reboiler and flow rate of the first fraction leaving the distillation unit,
      wherein the one or more devices is selected from: a valve operable to regulate flow of the feed stream into the distillation unit, a reboiler heater or valve operable to regulate entry of steam into the reboiler and a valve operable to regulate flow of the first fraction out of the distillation column,
      wherein a total profit from operation of the distillation unit at a given cut point temperature comprises multiplying a first chemical price consisting of the monetary value (per unit) of the first chemical by the percentage (mol %) of the first chemical in the first fraction, then adding to this the product of a second chemical price consisting of the monetary value (per unit) of the second chemical multiplied by the percentage (mol %) of the second chemical in the second fraction,
      wherein the first chemical price is selected from one of: 1) a first chemical commercial price and 2) a first product commercial price multiplied by the conversion efficiency from the first chemical to the first product multiplied by the cost (per unit) to convert the first chemical to the first product, wherein the first product is derived from the first chemical,
      wherein the second chemical price is selected from one of: 1) a second chemical commercial price and 2) a second product commercial price multiplied by the conversion efficiency from the second chemical to the second product multiplied by the cost (per unit) to convert the second chemical to the second product, wherein the second product is derived from the second chemical.

2. The system of claim 1, wherein the process controller is a model predictive controller.

3. The system of claim 1, wherein the process controller is operable to calculate a solution cut point temperature at a frequency in a range from once per 0.01 sec to once per day.

4. The system of claim 1, wherein the process controller is operable to calculate a solution cut point temperature at a frequency in a range from once per minute to once per hour.

5. The system of claim 1, wherein the first chemical is a class of chemical selected from C6 isoparaffins and n-paraffins and the second chemical is a class of chemical selected from at least one of C6 naphthenes and benzene.

6. The system of claim 1, wherein the first chemical price and the second chemical price are variables.

7. The system of claim 1, wherein the at least one analyzer is selected from a temperature sensor, a mass spectrometer, an UV spectrometer, an infrared spectrometer, an NMR spectrometer and a spectrophotometer.

8. The system of claim 1, wherein the feed stream is selected from a straight run light naphtha stream derived from an atmospheric distillation unit, a naphtha stream derived from a hydrocracker and a naphtha stream derived from a hydrotreater.

* * * * *